(12) United States Patent
Müller et al.

(10) Patent No.: US 7,693,852 B2
(45) Date of Patent: Apr. 6, 2010

(54) METHOD OF PRESENTATION FOR DATA RECORDS

(75) Inventors: Tobias Müller, Heiligenhaus (DE); Ron Schmalz, Munich (DE); Martin Staubach, Dormitz (DE); Norbert Weinreich, Uttenreuth (DE)

(73) Assignee: Siemens Aktiengesellschaft, Munich (DE)

( * ) Notice: Subject to any disclaimer, the term of this patent is extended or adjusted under 35 U.S.C. 154(b) by 516 days.

(21) Appl. No.: 11/343,392

(22) Filed: Jan. 31, 2006

(65) Prior Publication Data
US 2006/0179034 A1 Aug. 10, 2006

(30) Foreign Application Priority Data
Jan. 31, 2005 (DE) .................. 10 2005 004 446

(51) Int. Cl.
*G06F 17/30* (2006.01)
(52) U.S. Cl. .................................................. 707/100
(58) Field of Classification Search .......... 707/100, 707/101, 102, 103 R, 103 X, 103 Y, 103 Z; 715/760, 853, 854, 855; 345/619, 650, 661, 345/681
See application file for complete search history.

(56) References Cited

U.S. PATENT DOCUMENTS

| | | | | |
|---|---|---|---|---|
| 6,439,783 B1* | 8/2002 | Antoshenkov | ................. | 707/3 |
| 6,643,656 B2* | 11/2003 | Peterson | ................. | 707/100 |
| 7,124,145 B2* | 10/2006 | Surasinghe | ................. | 707/102 |
| 7,242,413 B2* | 7/2007 | Chu et al. | ................. | 345/619 |
| 7,290,222 B2* | 10/2007 | Guido et al. | ................. | 715/853 |
| 7,337,412 B2* | 2/2008 | Guido et al. | ................. | 715/853 |
| 7,366,711 B1* | 4/2008 | McKeown et al. | ................. | 707/3 |
| 2003/0126139 A1* | 7/2003 | Lee et al. | ................. | 707/100 |
| 2004/0239683 A1* | 12/2004 | Chu et al. | ................. | 345/619 |

* cited by examiner

*Primary Examiner*—Diane Mizrahi

(57) ABSTRACT

Data records contain identification data and user data and are either contained in a highest grouping level or are directly subordinate to precisely one data record group. Each data record group is either contained in the highest grouping level or is directly subordinate to precisely one data record group. Each data record group is in this way either empty or contains at least one directly subordinate element, which is either a data record group or a data record. A selection criterion is specified to a computer by a user, whereupon the computer displays to the user via a display device a list of at least the elements contained in the highest grouping level. The list is sorted according to an ordering criterion independent of the selection criterion. The identification data of each data record fulfilling the selection criterion and contained in the highest grouping level is displayed, and each data record group contained in the highest grouping level and to which at least one data record which fulfils the selection criterion is in turn directly or indirectly subordinate, is displayed. All other elements contained in the highest grouping level are not displayed. With regard to each displayed element, which is not contained in the highest grouping level, the data record group directly superordinate to the displayed element is displayed as well.

13 Claims, 5 Drawing Sheets

METHOD OF PRESENTATION FOR DATA RECORDS

CROSS REFERENCE TO RELATED APPLICATIONS

This application claims priority to the German application No. 10 2005 004 446.8, filed Jan. 31, 2005 which is incorporated by reference herein in its entirety

FIELD OF INVENTION

The present invention relates to a method of presentation for data records, with each data record containing identification data and user data and either being contained in a highest grouping level or being directly subordinate to precisely one data record group, with each data record group either being contained in the highest grouping level or being directly subordinate to precisely one data record group, so that each data record group is either empty or instead contains at least one directly subordinate element and each directly subordinate element is either a data record group or a data record.

The present invention further relates to a data carrier with a computer program, stored on the data carrier, for implementing a method of presentation of this type. The present invention finally also relates to a computer with a bulk storage facility, in which a computer program is stored, so that the computer executes a method of presentation of this type when the computer program is called up.

BACKGROUND OF INVENTION

Method of presentations for data records are generally known. An example of a method of presentation of this type is implemented in Windows Explorer by the company Microsoft.

Windows Explorer is generally operated using a number of windows. In one window, the computer indicates to a user a complete list of at least the elements contained in the highest grouping level. The list is sorted according to an ordering criterion. The ordering criterion thus consists in this case in the data record groups and then the data records being first listed within each associated group of elements, with an alphabetical sequence being maintained within the data record groups or within the data records. With regard to each displayed element which is not contained in the highest grouping level, the directly superordinate data record group for this record is also displayed.

Furthermore a user can specify a selection criterion to Windows Explorer. In response to the specification of the selection criterion, the computer then lists those data records which fulfill the selection criterion. In this case the records are listed inclusive of their respective access path, which thus also implicitly identifies the superordinate data record groups.

A data record, which is generally displayed in a separate window, can be selected by a user from both presentations.

SUMMARY OF INVENTION

The above-described procedure is acceptable with data structures, in which the individual data records (files, archives) are arranged in individual directories, if only very few data records are relevant for the user or the relevant data records are only distributed in a few directories. If the number of relevant data records increases on the other hand, and the data records are allocated to a greater number of directories, even users well versed in the system find it difficult to keep track.

An object of the present invention is thus to create a method of presentation by means of which a concise representation can always be available to the user, irrespective of the quantity and distribution of data records relevant to him/her.

The object is achieved for the method of presentation by the following features;

A user specifies a selection criterion to a computer

In response to the specification of the selection criterion the computer displays to the user via a display device a list of at least the elements contained in the highest grouping level The identification data of each data record contained in the highest grouping level which meets the selection criterion is displayed.

Each data record group contained in the highest grouping level, to which in its turn at least one data record meeting the selection criterion is directly or indirectly subordinate is displayed All other elements contained in the highest grouping level are not displayed With regard to each element displayed, the data record group directly superordinate to the displayed element is also shown herewith The list is sorted according to an ordering criterion independent of the selection criterion The object is further achieved by a data carrier, on which a corresponding computer program is stored. The object is finally also achieved by a computer with a mass storage facility, in which a corresponding computer program is stored.

The procedure according to the invention ensures that, on the one hand, the structure or position of the data records remains obvious, and, on the other hand, the user is only shown the data records and data record groups relevant for him/her.

When at least one of the displayed elements is a data record group, and in respect of this data record group, the identification data of each data record directly subordinate to these data record group which directly fulfills the selection criterion is displayed, each data record group directly subordinate to this data record group, to which in its turn at least one data record which fulfils the selection criterion is directly or indirectly subordinate, is displayed all other elements directly subordinate to this data record group are not displayed, the method functions even more effectively. In particular, this procedure allows the complete data record structure, which is relevant for the user, to be displayed in a concise and straightforward manner.

The representation is particularly concise if, in respect of each data record group, in which directly subordinate elements are displayed, the list of the displayed directly subordinate elements begins immediately after the relevant data record group has been displayed. This applies particularly if displayed elements, which are not contained in the highest grouping level, are shown indented compared with their directly superordinate data record group.

It is preferably possible for one of the displayed elements to be selected interactively by the user. If the user selects a data record group in this case, in respect of which directly subordinate elements are displayed, the computer preferably removes the displayed elements, which are directly and indirectly subordinate to the selected data record group, from the shown list. If the user selects a data record group, in respect of which no directly subordinate elements are displayed, the computer preferably records the elements directly subordinate to the selected data record group in the list already displayed, provided they fulfill the selection criterion, in the case of a data record, or at least one data record, which fulfills the selection criterion, is directly or indirectly subordinate thereto, in the case of a data record group. This allows an intentional insertion and removal of the elements of data record groups. The user can select the detail and clarity of the representation as and when required.

If the user selects identification data of a data record, the computer preferably displays its user data. This allows the data records to be called up directly from the display. In this case the computer can alternatively display the user data of the selected data record in a separate window of the display device or place it after the identification data of the selected data record.

If a data record symbol is assigned in each instance to the identification data of the displayed data records and a data record group symbol different from the data record symbol is assigned in each instance to the displayed data record group, the user can differentiate data records and data record groups from one another at a glance.

The users' overview of the list presented is even better if the displayed data record groups are assigned data record group symbols which differ from one another, depending on whether directly subordinate elements of this data record group are displayed or not.

If the computer determines the data records fulfilling the selection criterion on the basis of the user data of the data records, a particularly effective selection of the data record is possible, namely particularly on the basis of the content of the data record.

If at least the user data of the data record is created in a markup language, the analysis of the user data of the data records is particularly simple, both in principle and also in the case of checking for fulfillment of the selection criterion.

The representation is particularly concise if the ordering criterion for all listed data record groups is identical. The ordering criterion preferably consists of the data record group and then the data records being listed at first within the highest grouping level and within each data record group, with reference to which subordinate elements are displayed, with a uniform detailed ordering criterion being used within the data record group and within the data record. The detailed ordering criterion can be alphabetical sorting or sorting according to a time specification for instance. Sorting is also possible exclusively according to a time criterion.

BRIEF DESCRIPTION OF THE DRAWING

Further advantages and details emerge from the description below of an exemplary embodiment in conjunction with the drawings, in which.

DETAILED DESCRIPTION OF INVENTION

Figure 1:
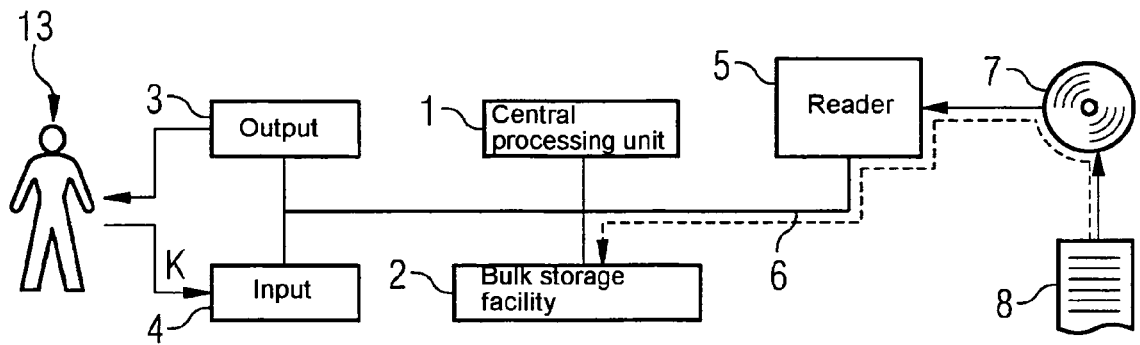
FIG. 1 shows a detailed description of a computer arrangement

According to FIG. 1, a computer comprises a central processing unit 1, a bulk storage facility 2, a display device 3, an input device 4 and a data carrier reader 5, which are connected to one another via a bus system 6. A computer program 8 is stored on a data carrier 7, a CD-ROM 7 for instance, in an exclusively machine-readable form. The data carrier 7 is inserted into the data carrier reader 5. The computer program 8 stored on the data carrier 7 is read out and is stored in the bulk storage facility 2 (typically a hard disk 2). When the computer program 8 is called up, the computer thus implements a method of presentation for data records 9, which is described in more detail below. The arrangement of the data records 9 and their structure is explained in more detail below in conjunction with FIGS. 2 and 3.

Figure 2:
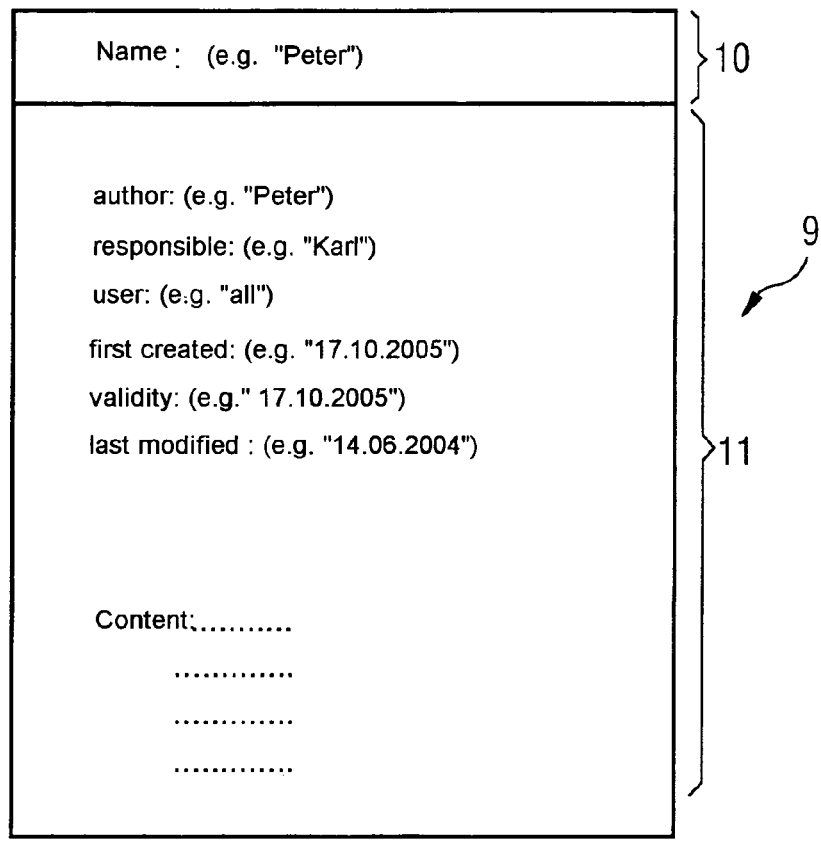
FIG. 2 shows a detailed description of a data record arrangement

According to FIG. 2, each data record 9 contains identification data 10 ("a name") and user data 11. At least the user data 11, preferably even the complete data record 9, is created in a markup language, in XML or HTML for instance, according to FIG. 2. The user data 11 contains the creator of the data record 9 for instance ("author"), the person responsible for the data record 9 ("responsible"), the specific user group ("users"), time specifications ("first created", "valid until", "last modified", . . . ) etc.

Figure 3:
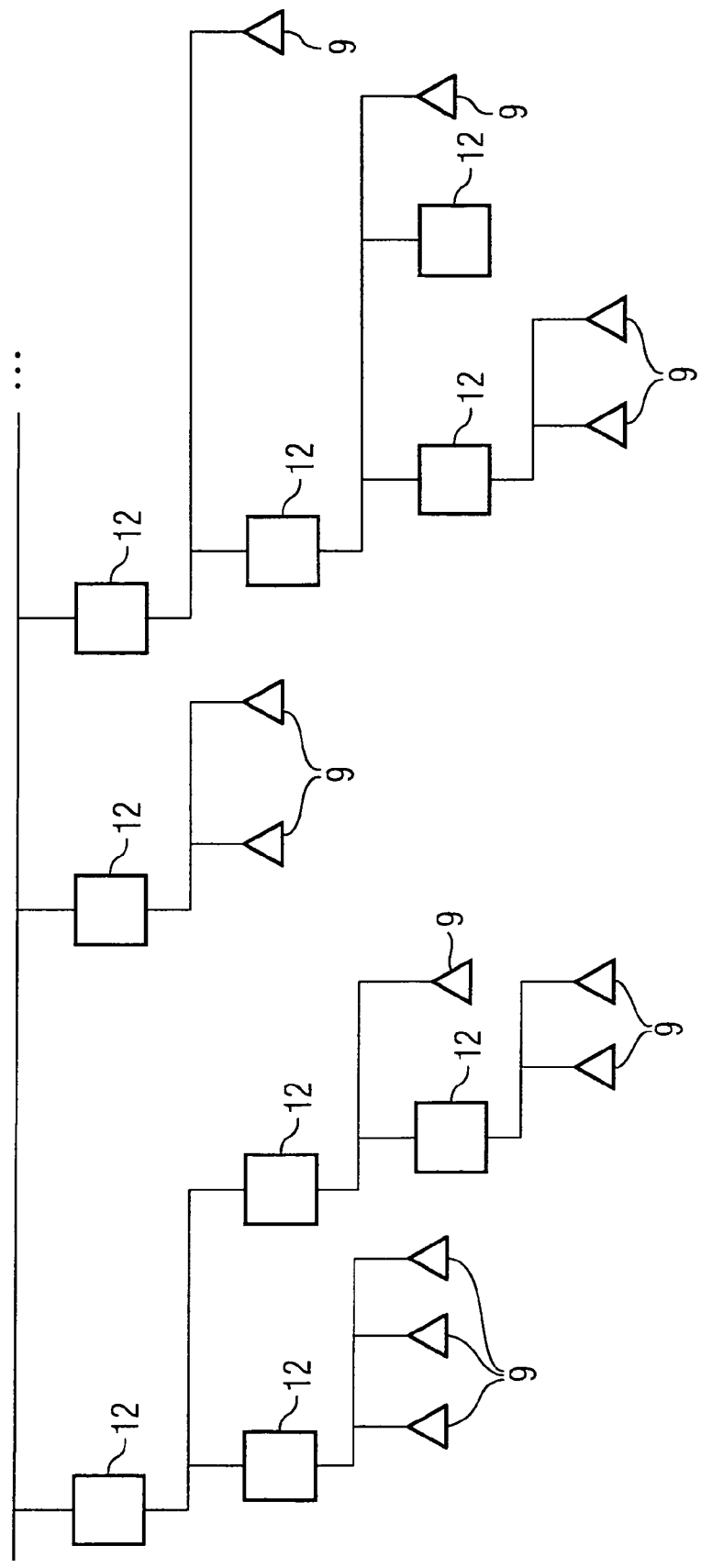
FIG. 3 shows a detailed description of groupings of data records

The data records 9 are structured according to FIG. 3. The data records 9 themselves are shown here in FIG. 3 as small triangles, the data record groups 12 superordinate to the data records 9 as small squares.

According to FIG. 3, a highest grouping level exists which can contain data records 9 and data record groups 12. Elements 9, 12 can be directly subordinate to each data record group 12, with each element 9, 12 being either a data record 9 or a data record group 12. In the result, each element 9, 12 is valid irrespective of whether it is a data record 9 or a data record group 12, in that it is either contained in the highest grouping level or is directly subordinate to precisely one data record group 12. The elements 9, 12 of the highest grouping level are naturally not subordinate to any data record group 12.

The data record groups 12 generally contain a number of directly subordinate elements 9, 12. However in particular cases, they can also contain only one individual element 9, 12 or even be empty.

Figure 4:
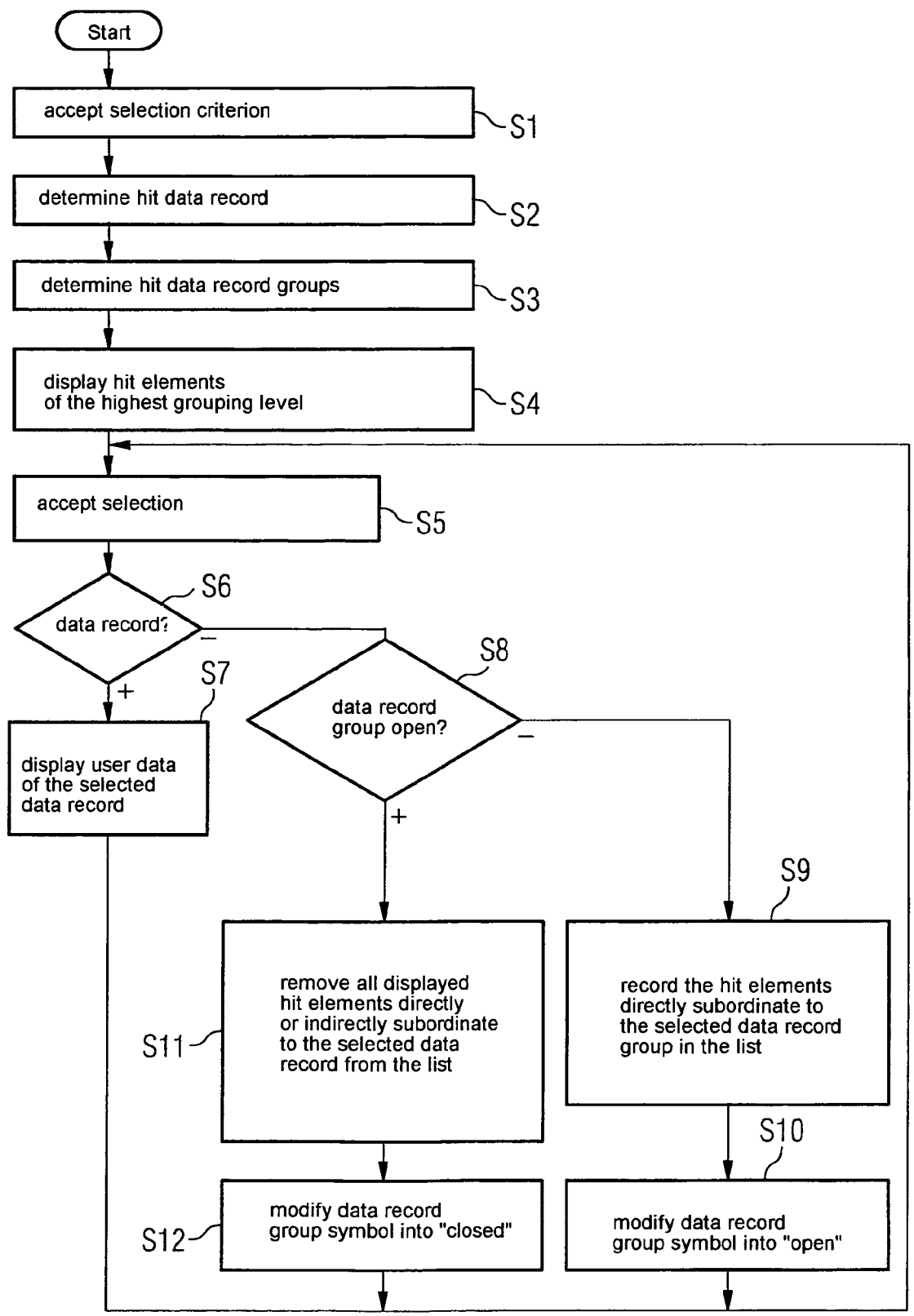
FIG. 4 shows a detailed description of a flow diagram

According to FIG. 4, in a step S1, a selection criterion K is specified to the computer by a user 13 via the input device 4. For example it is assumed below that K was specified as a selection criterion, that data record 9 is to be sought, the author of which is "Peter". Any other selection criterion K would also be conceivable. The formation of a complex selection criterion K is also conceivable by logically combining subcriteria using the logical operators AND, OR and NOT.

In response to the specification of the selection criterion default K, in a step S2, the computer individually checks the data records 9. It determines, on the basis of the user data 11 of the data records 9 (in the present example with reference to the entry in the category "author"), which data records 9 fulfill the selection criterion K. These data records 9 are subsequently referred to as hit data records 9.

For each hit data record 9, which is not already automatically contained in the highest grouping level, the computer then determines, in a step S3, its superordinate data record group 12. In this case, in step 3, both the directly superordinate data record group 12 and also some further superordinate data record groups 12 are determined. The data record groups 12 directly or indirectly superordinate to the hit data records 9 are subsequently referred to as hit data record group 12. The term hit elements 9, 12 is subsequently used below as the generic term for hit data records 9 and hit data record groups 12.

Figure 5:
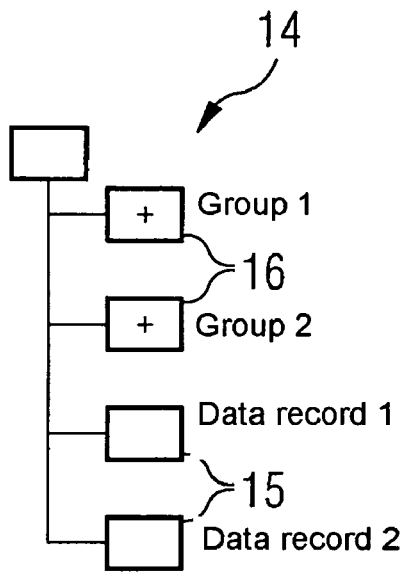
FIG. 5 shows a detailed description of a first list of hit elements

In a step S4, the computer initially displays to the user 13 via the display device, see FIG. 5, a list 14 of the hit elements 9, 12, which are contained in the highest grouping level. In more precise terms, the user 13 is shown a list 14 of elements 9, 12 contained in the highest grouping level by means of the display device 3. In this case the displayed hit elements 9, 12 are sorted according to an ordering criterion which is independent of the selection criterion K. For example, the hit data record groups 12 of the highest grouping level are displayed first and subsequently the hit data records 9 of the highest grouping level. The hit data record groups 12 can be sorted alphabetically for instance. The hit data records 9 can likewise be sorted alphabetically.

With regard to the hit data records 9, only their identification data 10 is displayed within the scope of step S4, and not their user data 11. The hit data record groups 12 by contrast are displayed as such. The hit data record groups 12 can, in this case, be readily distinguished from the hit data records 9, since a data record symbol 15 is assigned in each instance to the identification data 10 of the displayed hit data record 9 according to FIG. 5, whereas a data record group symbol 16 is assigned to the displayed hit data record groups 12, said data record group symbol 16 being different from data record symbol 15. By way of example, the data record symbol 15 can be an empty frame, whilst a frame with a sign arranged therein can be used as a data record group symbol 16.

The data records displayed and contained in the highest grouping level all automatically fulfill the selection criterion. The other data records 9 contained in the highest grouping level do not fulfill the selection criterion K. They are thus not displayed as well.

Likewise each displays data record group 12 contained in the highest grouping level contains at least one data record 9, which is directly (thus immediately) or indirectly (thus via at least one further, intermediately arranged data record group 12) subordinate to the displayed data record group 12, and fulfils the selection criterion K. A data record 9, which fulfills the selection criterion K, is neither directly nor indirectly subordinate to the other data record groups 12 contained in the highest grouping level. They are thus not displayed as well.

In a step S5, the user 13 can now interactively select one of the displayed hit elements 9, 12. In this case, the selected element 9, 12 can alternatively be a hit data record 9 or a hit data record group 12. In a step S6, the computer thus checks whether a hit data record 9 or a hit data record group 12 was selected. Depending on the result of the check, the computer continues with the method of presentation according to the invention with a step S7 or a step S8.

Figure 6:
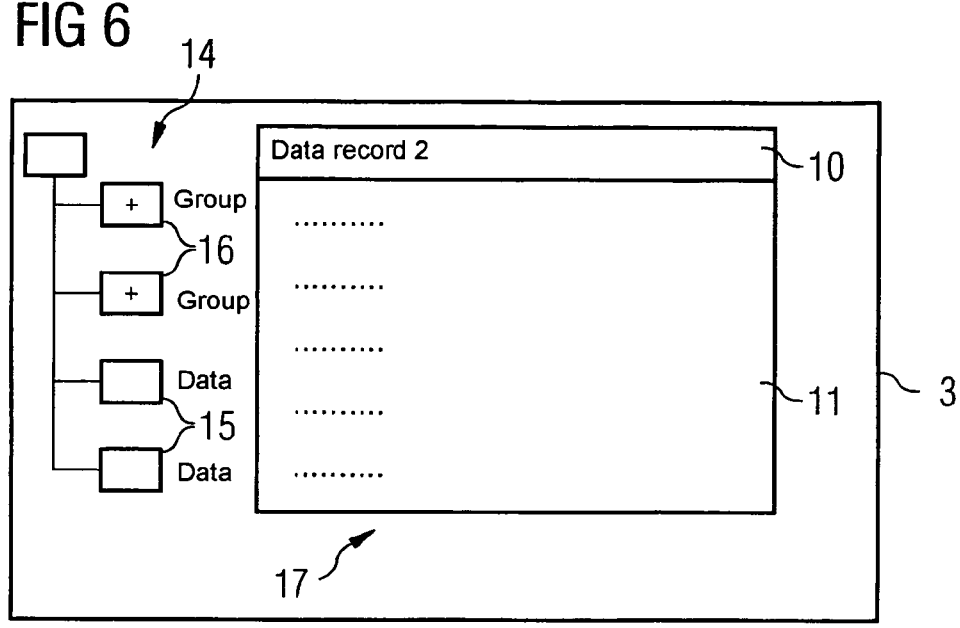
Figure 7:
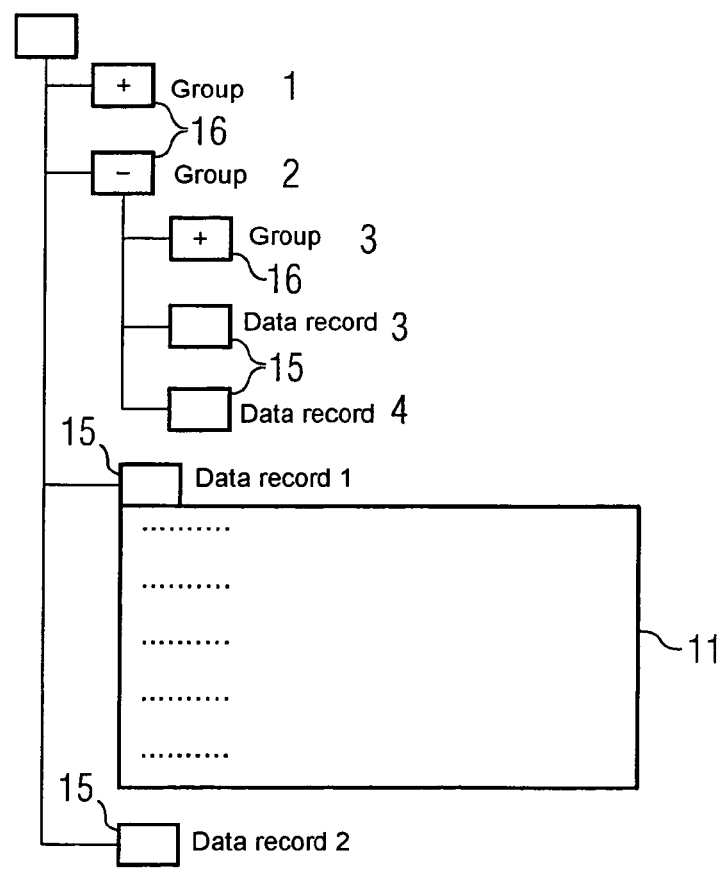

If in step S5 the user 13 has selected a hit data record 9, in step S7 the computer displays the user data 11 of the selected data record 9. For example, the computer can display the user data 11 of the selected data record 9 in a separate window 17 of the display device 3, as shown in FIG. 6. Alternatively it is also possible for the computer to place the user data 11 of the selected data record 9, as shown schematically in FIG. 7, immediately after the identification data 10 of the selected data record 9 within the displayed list 14.

If on the other hand the user 13 has selected a data record group 12, the computer checks, in step S8, whether this data record group 12 is open or closed. "Open" means in this case that, with reference to the selected data record group 12, at least its directly unordered elements 9, 12 are displayed in the list 14, provided they are hit elements 9, 12. "Closed" means that the subordinate elements 9, 12, are not displayed in the list 14, irrespective of whether they are directly or indirectly subordinate to the selected data record group 12.

Figure 8:
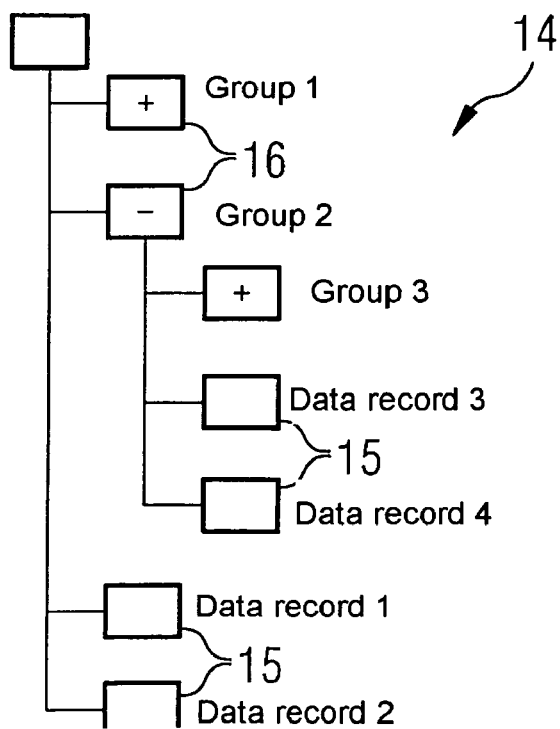
FIG. 6 shows a detailed description of the list in FIG. 5 with a window shown and FIGS. 7 and 8 show detailed descriptions of modifications of the list in FIG. 5.

If the selected data record group 12 is closed (see definition above), the computer continues with the inventive method of presentation in a step S9. In step S9, the computer "opens" the selected data record group 12. It thus records the hit elements 9, 12, which are directly subordinate to the selected data record group 12, in the already displayed list 14. This is shown in FIG. 8. The comparison of FIGS. 5 and 8 shows that all hit elements 9, 12 already displayed are retained. Thus, for all displayed elements 9, 12, which are not contained in the highest grouping level, the data record group 12 directly superordinate to the displayed element 9, 12 is also always displayed as well.

Only the hit elements 9, 12 of the now open data record group 12 are displayed. The following are thus displayed the identification data 10 of each data record 9, which fulfills the selection criterion K, and is directly subordinate to this data record group 12, each data record group 12 directly subordinate to this data record group 12, to which a data record 9, which fulfills the selection criterion K, is in turn directly or indirectly subordinate.

All other elements 9, 12 directly subordinate to the selected data record group 12 are not displayed.

Furthermore, it is also evident from FIG. 8 that, with regard to each data record group 12, in which directly subordinate elements 9, 12 are displayed, the list 14 of the displayed directly subordinate elements 9, 12 begins immediately after the display of the respective data record group 12. However the displayed elements 9, 12 are indented compared with their directly superordinate data record group, for the purpose of highlighting that these hit elements 9, 12 belong to the next lower grouping level.

Furthermore, the now newly inserted hit elements 9, 12 are listed according to the same ordering criterion, which has already been explained above in conjunction with the hit elements 9, 12 of the highest grouping level. The ordering criterion is thus the same for all displayed data records 9 and data record groups 12.

After step S9, the computer executes a step S10. In step S10, the computer modifies the data record group symbol 16 assigned to the selected data record group 12. For example, it can modify the sign arranged in the frame from a "closed symbol" to an "open symbol". A plus sign can be used as a "closed symbol"—purely by way of example, and a minus sign as an "open symbol" likewise purely by way of example.

If, conversely, the selected data record group 12 is already open (see definition above), the computer continues with the method of presentation according to the invention in a step S11. In step S11, the computer "closes" the selected data record group 12. It thus removes all displayed hit elements 9, 12, subordinate to the selected data record group 12, from the displayed list 14. The computer 14 removes both the hit data records 9 directly subordinate to the selected data record groups 12 and also the hit data record groups 12 directly subordinate to the selected data record group 12 and also the elements 9, 12 directly or indirectly subordinate to this last mentioned data record group 12. The computer then executed a step S12, in which it modifies (conversely to step S10) the data record group symbol 16 from "open" to "closed".

For improved clarification purposes only, a termination routine for terminating the method displayed therein is not shown in FIG. 4. A termination routine of this type is of course available however.

The procedure described above in conjunction with the steps S5 to S12 is naturally not only possible with regard to the hit elements 9, 12 of the highest grouping level, but also of the subordinate grouping level with regard to each grouping level. The user 13 is thus able to open or close data record groups 12 if necessary and to open data records 9. The data records 9 can naturally also be re-closed. In this case, the user 13 is always offered only hit elements 9, 12 for selection. Irrespective of the grouping level in which a data record 9 or a data record group 12 is arranged, it is always true to say that a data record 9 is only displayed if it automatically fulfills the selection criterion, and a data record group 12 is always only displayed if a data record 9, which fulfills the selection criterion K, is directly or indirectly subordinate thereto.

By means of the method of presentation according to the invention, a selective presentation of hit data records 9 and hit data record groups 12 is thus possible in a simple manner, said method providing the user 13 at any time with a simple and clear orientation of the given structuring of the data records 9 and simultaneously allowing him to select individual data records 9 at any time.

The invention claimed is:

1. A method of presenting data records, wherein each in a plurality of such data records includes both identification data and user data, and each data record is included in either a highest hierarchical grouping level or is included in a level subordinate to a data record group in the highest grouping level, so that each data record group is either included in the highest grouping level or in the next level directly subordinate to the highest grouping level such that any data record group subordinate to the highest grouping level includes at least one element in a level subordinate to a data record group in the highest grouping level, wherein every directly subordinated element is either a data record group or a data record, the method comprising:

specifying a selection criterion for a computer search by a user to identify and provide a list from which only data record groups or data records meeting the selection criterion can be displayed;

applying the selection criterion to search data among each in the plurality of data records and determine, on the basis of the searched data, which of the data records satisfy the criterion;

assembling into a list for display to the user on a display device, only those of the searched data records and data record groups which satisfy the search criterion such that data records and data record groups not satisfying the search criterion cannot be displayed on the display device simultaneously with display of the searched data records and data record groups which satisfy the search criterion, this resulting in a list including only those of the subordinated elements which satisfy the selection criterion, wherein display on the display device of the searched data records and data record groups which satisfy the search criterion includes displaying such identification data of each data record included in the highest grouping level satisfying the selection criterion; and wherein display on the display device of the searched data records and data record groups which satisfy the search criterion includes displaying only such data record groups included in the highest grouping level having at least one data record subordinate to the data record group, the at least one data record satisfying the selection criterion, and not permitting display of any subordinated elements included in the highest grouping level that do not have at least one data record satisfying the selection criterion; and wherein the display on the display device of the searched data records and data record groups which satisfy the search criterion includes such data record groups directly superordinated to any subordinated data record satisfying the selection criterion but not included in the highest grouping level; and sorting the list according to an ordering criterion independent from the selection criterion.

2. The method according to claim 1, wherein at least one of the subordinated elements included in the list is a data record group, identification data of each data record subordinate to a displayed data record group is displayed, with the data record for which identification data is displayed satisfying the selection criterion, and each of any data record group subordinate to the highest data record group is displayed only if the data record group subordinate to the highest data record has at least one data record satisfying the selection criterion, such that none of the displayable elements subordinate to the displayed highest data record group fail to satisfy the selection criterion.

3. The method according to claim 1, wherein with regard to any displayed data record group subordinate to the highest grouping level, said data record group is displayed in the list immediately after the data record group to which it is subordinate.

4. The method according to claim 1, wherein all subordinate elements included in the list which are not in the highest grouping level are displayed indented relative to the data record group superordinate to such subordinate elements.

5. The method according to claim 1, wherein at least one of the displayed elements subordinate to a higher data record group is selected interactively by the user, and the selected subordinate element is a data record group having one or more subordinate elements which are displayed.

6. The method according to claim 1, wherein the computer displays user data for a data record upon selection of identification data of such data record.

7. The method according to claim 6, wherein the user data are displayed in a separate window on the display device.

8. The method according to claim 6, wherein the user data are displayed immediately after the identification data.

9. The method according to claim 1, wherein a data record symbol is assigned to the identification data of each displayed data record, and a data record group symbol different from the data record symbol is assigned to each displayed data record group.

10. The method according to claim 9, wherein the data record group symbol indicates if the respective data record group has at least one directly subordinated element or not.

11. The method according to claim 1, wherein the computer determines such data records fulfilling the selection criterion based on the user data of the respective data record.

12. The method according to claim 1, wherein at least the user data of the data records are created in a markup language.

13. The method according to claim 1, wherein the ordering criterion is identical for all displayed data records and data record groups.

* * * * *